United States Patent [19]

Miyakawa

[11] E Patent Number: Re. 32,466

[45] Reissued Date of Patent: Jul. 28, 1987

[54] HEAT-SENSITIVE COLOR-FORMING RECORDING MATERIAL AND PROCESS FOR PREPARATION THEREOF

[75] Inventor: Nobuhiro Miyakawa, Esaka, Japan

[73] Assignee: Mita Industrial Co Ltd., Osaka, Japan

[21] Appl. No.: 880,431

[22] Filed: Jun. 30, 1986

Related U.S. Patent Documents

Reissue of:

[64] Patent No.: 4,459,336
Issued: Jul. 10, 1984
Appl. No.: 506,227
Filed: Jun. 23, 1983

U.S. Applications:

[62] Division of Ser. No. 346,772, Feb. 8, 1982, abandoned.

[30] Foreign Application Priority Data

Feb. 9, 1981 [JP] Japan ..... 56-16820
Feb. 9, 1981 [JP] Japan ..... 56-16821

[51] Int. Cl.[4] ..... B41M 5/18

[52] U.S. Cl. ..... 503/208; 503/209; 503/214; 427/150; 427/151

[58] Field of Search ..... 346/207, 208, 209, 214; 427/150, 151, 152; 428/323, 411.1, 537.5, 488.1, 488.4, 913

[56] References Cited

U.S. PATENT DOCUMENTS

| | | | |
|---|---|---|---|
| 4,032,690 | 6/1977 | Kohmura et al. | 428/913 |
| 4,236,732 | 12/1980 | Murakami et al. | 346/214 |
| 4,287,264 | 9/1981 | Marginean | 106/21 |
| 4,295,888 | 10/1981 | Greenwood et al. | 106/21 |

*Primary Examiner*—Bruce H. Hess
*Attorney, Agent, or Firm*—Sherman & Shalloway

[57] ABSTRACT

Disclosed is a heat-sensitive color-forming recording material which comprises a recording layer comprising a particulate phenolic color developer and a particulate leuco pigment, which are dispersed in a binder independently from each other, wherein the phenolic color developer and/or leuco pigment is present in the form of compatible solid particles with a substantially inactive organic solid medium having a melting or softening point lower than that of the phenolic color developer and/or leuco pigment and said organic solid medium is present in said compatible solid particles in an amount [2 to 250 times as large as] *of 0.2 to 250% by weight, based on* the amount of the phenolic color developer and/or leuco pigment on the weight base. This heat-sensitized color-forming recording material is highly sensitive without substantial increase of the fog density.

6 Claims, 1 Drawing Figure

HEAT-SENSITIVE COLOR-FORMING RECORDING MATERIAL AND PROCESS FOR PREPARATION THEREOF

Matter enclosed in heavy brackets [ ] appears in the original patent but forms no part of this reissue specification; matter printed in italics indicates the additions made by reissue.

This application is a division, of application Ser. No. 346,772, filed Feb. 8, 1982, now abandoned.

BACKGROUND OF THE INVENTION (1) Field of the Invention

The present invention relates to a heat-sensitive color-forming recording material. More particularly, the present invention relates to a heat-sensitive recording material which is sensitized without substantial increase of the fog density.

(2) Description of the Prior Art

The combination of a leuco pigment and a color developer composed of an acidic substance has been widely used for recording of informations, for example, heat-sensitive recording, pressure-sensitive recording and electrostatic photographic recording. For example, as a recording element for heat-sensitive recording, there has been used a recording material comprising a recording layer formed on a substrate, said recording layer being obtained by dispersing a leuco pigment which is colorless or has a light color in the normal state and a phenol which is solid at normal temperature but is heat-fusible, in a polymeric binder independently in separate phases.

In this heat-sensitive recording material, color formation is effected when the leuco pigment and phenolic color developer are reacted with each other in the state activated by heat, especially in the fused state. Since fusion of the phenolic color developer or leuco pigment is not caused unless the temperature is considerably high, the heat sensitivity of the recording material is low and the density of a recorded image is generally low. Furthermore, since recording must be carried out at a high temperature, this recording material is disadvantageous in that a high temperature heat source is necessary. Moreover, the temperature of a transportation system in a heat-sensitive recording apparatus is elevated, and therefore, fogging is readily caused to occur.

SUMMARY OF THE INVENTION

I found that when such phenolic color developer and/or leuco pigment is dispersed in a binder in the form of compatible solid particles with a substantially inactive organic solid medium which has a melting point or softening point lower than the melting point of the phenolic color developer and/or leuco pigment and also has a compatibility with the phenolic color developer and/or leuco pigment and a recording layer is formed from this dispersion, the heat sensitivity can be prominently improved without substantial increase of the fog density.

More specifically, in accordance with the present invention, there is provided a heat-sensitive color-forming recording material which comprises a recording layer comprising a particulate phenolic color developer and a particulate leuco pigment, which are dispersed in a binder independently from each other, wherein the phenolic color developer and/or leuco pigment is present in the form of compatible solid particles with a substantially inactive organic solid medium having a melting or softening point lower than that of the phenolic color developer and/or leuco pigment and said organic solid medium is present in said compatible solid particles in an amount 2 to 250 times as large as the amount of the phenolic color developer and/or leuco pigment on the weight base.

DETAILED DESCRIPTION OF THE PREFERRED EMBODIMENTS

Figure 1:
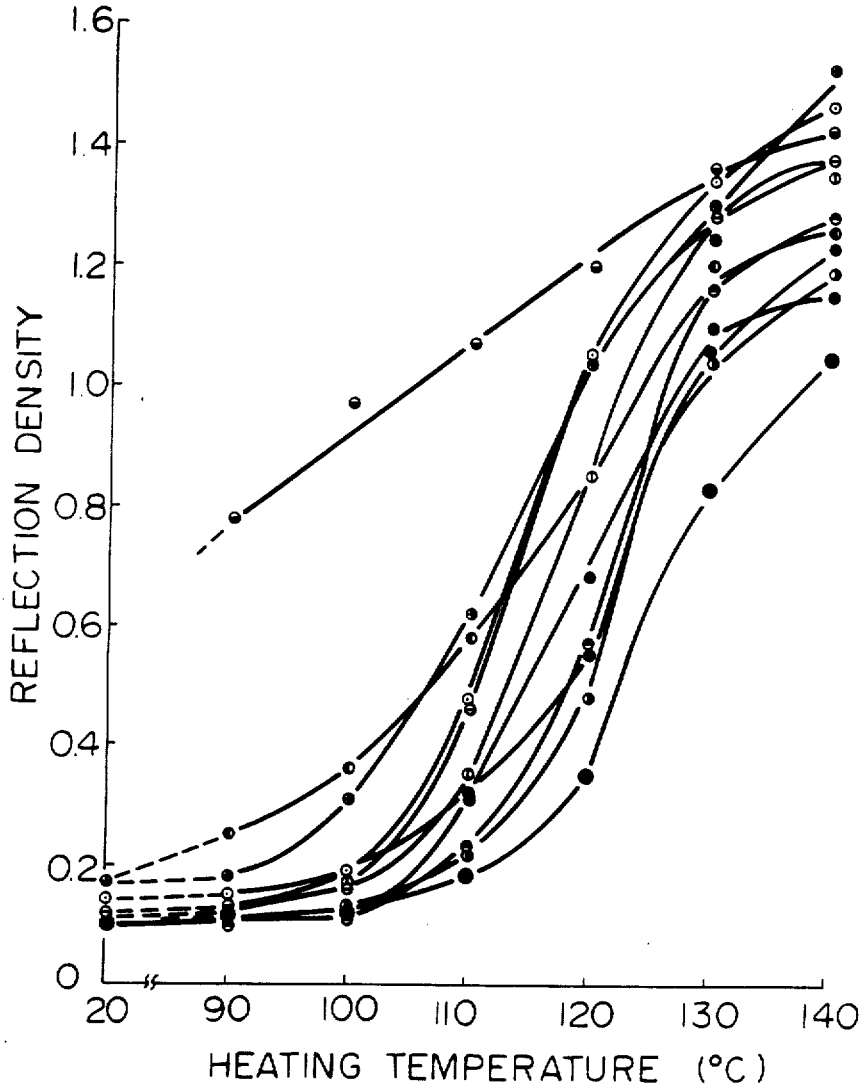
FIG. 1 is a graph showing the relation between the heating temperature and the reflection density in heat-sensitive recording materials according to the present invention.

The phenolic color developer that is used in the present invention is solid at normal temperature and is heat-fusible and it is a prototropic phenol in the fuse state. As preferred examples of the phenolic color developer, there can be mentioned 4,4'-isopropylidene diphenol (bisphenol A), 4,4'-methylene-bis(phenol), 4,4'-isopropylidene-bis(2-chlorophenol), 4,4'-isopropylidene-bis(2,6-dichlorophenol), 4,4'-isopropylidene-bis(2-methylphenol), 4,4'-isopropylidene-bis(2-tert-butylphenol), 4,4'-sec-isobutylidene-bis(2-methylphenol), 4,4'-cyclohexylidene-diphenol, 2,2'-thiobis(4,6-dichlorophenol), p-tert-butylphenol, 3,4-dichlorodiphenol, o,o'-diphenol, 4-hydroxydiphenoxide, 2,2'-dihydroxy-bisphenol, 2,2'-methylene-bis(4-chlorophenol), 2,6-dihydroxybenzoic acid and 1-hydroxy-2-napthoic acid.

All the leuco pigments customarily used for heat-sensitive recording materials of this type can be used in the present invention. For example, triphenylmethane leuco pigments, fluoran type leuco pigments, spirooyran type leuco pigments, rhodamine lactam type pigments, auramine type leuco pigments and phenothiazine type leuco pigments may be used singly or in combination. Preferred examples are as follows.

Triphenylmethane type leuco pigments 3,3-Bis(p-dimethylaminophenyl)phthalide, 3,3-bis(p-dimethylaminophenyl)-6-dimethylaminophthalide, 3,3-bis(p-dimethylaminophenyl)-6-diethylaminophthalide, 3,3-bis(p-dimethylaminophenyl)-6-diethylaminophthalide, 3,3-bis(p-dimethylaminophenyl)-6-methoxyphthalide, 4-hydroxy-4'-dimethyl-aminotriphenylmethane-lactone, and 4,4'-bishydroxy-3,3'-bis-diaminotriphenylmethane-lactone.

Fluoran type leuco pigments

3-Dimethylamino-5,7-dimethylfluoran, 3-diethylamino-5,7-dimethylfluoran, 3-diethylamino-6,7-dimethylfluoran, 3-cyclohexylamino-6-chlorofluoran, 3-dimethylamino-6-methoxyfluoran, 3,6-bis-$\beta$-methoxyethoxyfluoran, 3-diethylamino-7-dibenzylaminofluoran, 3-diethylamino-6-methyl-7-chlorofluoran, 3-diethylamino-6-methyl-7-anilinofluoran, 3,7-bisdiethylaminofluoran and 3-diethylamino-7-methoxyfluoran.

Spiropyran type leuco pigments

8'-Methoxybenzoindolinospiropyran, 3-phenyl-8'-methoxybenzoindolinospiropyran, 6'-chloro-8'-methoxybenzoindolinospiropyran, 5,6'-dichloro-8'-methoxybenzoindolinospiropyran, 4,7,8'-trimethoxybenzoindolinospiropyran, benzo-β-naphthospiropyran, 3-methyl-di-β-naphthospiropyran and 1,3,3-trimethyl-6'-chloro-8'-methoxyindolinobenzospiropyran.

Rhodamine lactam type leuco pigments 9-(p-Nitroanilino)3,6-bis(diethylamino)-9-xanthyl-o-benzoic acid lactam and 2-[3,6-bis(diethylamino)-9-(o-chloroanilino)xanthyl]-benzoic acid lactam.

Auramine type leuco pigments 2,5-Dichloro-N-phenyl-leucoauramine, 4,4'-bisdimethylamino-3,4-chlorophenyl-leucoauramine and 4,4'-bis-dimethylaminopiperazine hydrol.

Phenothiazine leuco type pigments

Benzoyl leuco methylene blue, p-chlorobenzoyl leuco methylene blue, 3,4-dichlorobenzoyl leuco methylene blue and p-methoxybenzoyl leuco methylene blue.

According to the present invention, the above-mentioned phenolic color developer and/or leuco pigment is combined with a specific organic solid medium which has a melting or softening point lower than that of the phenolic color developer and/or leuco pigment and is substantially inactive and compatible with the phenolic color developer and/or leuco pigments, especially water-insoluble one, and the phenolic color developer and/or leuco pigment is used in the form of compatible solid particles with said organic solid medium.

As the solid medium, there are preferably used higher saturated fatty acids and their metal salts, amides, hydrazides, methylolated products and esters, though applicable solid media are not limited to these compounds. As preferred examples of the higher saturated fatty acid, there can be mentioned those having 6 to 30 carbon atoms, such as stearic acid, palmitic acid, myristic acid, lauric acid and behenic acid. As the metal salt, there can be mentioned zinc salts, calcium salts, magnesium salts, lead salts, cadmium salts, barium salts and aluminum salts. As the amide, there can be used not only monoamides of the above-mentioned fatty acids but also bis-amides such as ethylene-bis-stearylamide. As the hydrazide, there can be used hydrazides of the above-mentioned fatty acids. As the methylolated product, there can be used methylolated products of the above-mentioned fatty acid amides, such as stearylmethylolamide. As the ester, there can be used triglyceride and glycol diesters of the above-mentioned fatty acids, such as beef tallow and hardened oil, sorbitan monoesters of the above-mentioned fatty acids, esters of the above-mentioned fatty acids with higher alcohols such as cetyl alcohol, and esters of the above-mentioned fatty acids with polyhydric alcohols such as ethylene glycol and propylene glycol.

As other preferred examples of organic solid medium, there can be mentioned higher alcohols having 16 to 30 carbon atoms, such as cetyl alcohol and stearyl alcohol, oxidized polyethylene waxes and alcohol- and acid-modified oxidized polyethylene waxes, microcrystalline wax, and natural waxes such as carnauba wax, candelilla wax and bees wax.

Furthermore, there may be used low-molecular-weight polymers of vinyl aromatic compounds such as styrene and vinyltoluene and low-molecular-weight polymers of nitrogen-containing heterocyclic vinyl compounds such as 2-vinylpyridine.

The kinds of organic solid media that can be used in the present invention are not limited to those exemplified above. For example, antioxidants, thermal stabilizers and ultraviolet ray absorbers may be used, so far as they are substantially inactive and compatible with the phenolic color developer or leuco pigments and have a melting point lower than that of the phenolic color developer or leuco pigment. Examples of the solid medium of this type include sterically hindered phenols such as 2,6-di-tert-butyl-p-cresol, 2,2-methylene-bis(4-ethyl-6-tert-butylphenol), 2-hydroxy-4-methoxybenzophenone, phenyl salicylate, p-tertbutyl salicylate and 2-(2'-hydroxy-5'-methylphenyl)benzotriazole, and sulfur-containing organic compounds such as pentaerythritol tetrakis(β-laurylthiopropionate), zinc dibutyldithiocarbamate and 4,4'-dithiomorpholine.

High density polyethylene waxes and similar non-polar waxes becomes incompatible with the phenolic color developer or leuco pigment when their molecular weights are increased. Accordingly, use of these waxes are not preferred for attaining the objects of the present invention. When the recording layer is formed by using an aqueous coating composition, use of a water-soluble solid medium such as an alkali metal salt of a higher fatty acid is not preferred because such solid medium is readily dissolved into water.

Moreover, an acidic solid medium such as a high fatty acid is not preferred as the solid medium for formation of compatible solid particles with the leuco pigment, because color formation takes place when such solid particles are prepared.

When both the leuco pigment and the phenolic color developer are used simultaneously for formation of compatible solid particles, it is preferred that a solid medium which is compatible with both the leuco pigment and the phenolic color developer, such as a fatty acid amide, be used.

In the present invention, when the phenolic color developer and/or leuco pigment is dispersed and made present in the binder of the recording layer in the form of compatible solid particles with the above-mentioned solid medium, the heat sensitivity is prominently improved over the sensitivity attained when the phenolic color developer or leuco pigment is singly incorporated into the binder in the form of particles. For example, when a color former composed of bisphenol A is employed and particles of this color developer are dispersed in a binder, there is obtained only an image having a reflection density of 0.35 at 120° C., whereas when bisphenol A is used in the form of compatible solid particles with ethylene-bis-stearylamide, the reflection image density is increased to 1.05, that is, a level 3 times as high as the above reflection density, under the same recording conditions. It is believed that the reason is that the melting point of the phenolic color developer is reduced in the form of the above-mentioned compatible solid particles, the prototropy becomes possible at a lower temperature. Furthermore, for example, when a leuco pigment composed of Crystal Violet Lactone is used, if recording is carried out at 110° C., an image having a reflection density of only 0.40 is obtained. On the other hand, when Crystal Violet Lacton is used in the form of compatible solid particles with 10% by weight of an oxidized polyethylene wax, an image having a reflection density of 0.76 can be obtained and the reflection density is increased to a level about 2 times as high as the above reflection density. It is believed that the reason is that the melting point of the leuco pigment is reduced in the form of the above-mentioned compatible solid particles and activation of the leuco pigment becomes possible at a lower temperature.

In the present invention, it is important that the above-mentioned solid medium should be used in an amount [2 to 250 times, especially 5 to 100 times,] *of 0.2 to 250%, preferably 5 to 100% by weight, based on* the amount of the phenolic color developer and/or leuco pigment on the weight base. When the amount of the solid medium is too small and below the above range, the degree of reduction of the melting point is low and no prominent improvement of the heat sensitivity can be attained. On the other hand, if the amount of the solid medium is too large and is beyond the above range, the entire concentration of the phenolic color developer or leuco pigment is reduced, and consequently, the image density is lowered.

In the present invention, the above-mentioned compatible solid particles are prepared according to any of the following methods.

According to the first method of the present invention, a phenolic color developer or leuco pigment and a substantially inactive organic solid medium which has a melting or softening point lower than that of the phenolic color developer or leuco pigment and is compatible with the phenolic color developer or leuco pigments are dissolved in a solvent for them to form a mixed solution, and this solution is then mixed with a precipitating medium which is miscible with said solvent but is a non-solvent for the color developer or pigment and the solid medium to precipitate compatible solid particles of the phenolic color developer or leuco pigment and the organic solid medium.

As the solvent, a water-miscible organic solvent is preferably used, and as the non-solvent, water is preferably used. As the water-miscible organic solvent, there can be mentioned, for example, alcohols such as methanol, ethanol, propanol and diacetone alcohol, ketones such as acetone and methylethyl ketone, cyclic ethers such as dioxane and tetrahydrofuran, esters such as methyl cellosolve acetate, carbitol acetate and methylcarbitol acetate, sulfoxides such as dimethylsulfoxide, N,N-di-substituted amides such as dimethylformamide and dimethylacetamide, and lactones such as γ-valerolactone. The phenolic color developer or leuco pigment and the organic solid medium are dissolved in the organic solvent at the above-mentioned ratio so that the entire solid concentration is 10 to 50% by weight, especially 20 to 40% by weight. The resulting solution is mixed with water at a weight ratio of from 1/5 to 1/30, especially from 1/10 to 1/20, whereby compatible solid particles are precipitated, and these particles are then filtered, washed with water and dried according to need.

According to the second method of the present invention, a phenolic color developer or leuco pigment and a substantially inactive organic solid medium which has a melting or softening point lower than that of the phenolic color developer or leuco pigment and is compatible therewith are dissolved in a solvent for them at a high temperature and a high concentration to form a mixed solution, and the resulting solution is cooled to precipitate compatible solid particles of the phenolic color developer or leuco pigment and the organic solid medium.

As the organic solvent, there may be used not only the above-mentioned water-miscible organic solvents but also aromatic solvents such as benzene, toluene and xylene and halogenated hydrocarbon solvents such as chlorobenzene, and solvents having a high boiling point are especially preferred. It is preferred that the difference between the high temperature adopted for dissolution and the low temperature adopted for precipitation be at least 50° C., especially at least 70° C.

According to the third method, a mixture of a phenolic color developer or leuco pigment and a substantially inactive organic solid medium which has a melting or softening point lower than that of the phenolic color developer or leuco pigment and is compatible therewith is molten, and the melt is granulated after cooling or under cooling to form compatible solid particles of the phenolic color developer or leuco pigment and the organic solid medium. For granulation of the melt, there may be adopted a method in which a cooled melt is pulverized and is then sieved if necessary, and a method in which the melt is subjected to spray granulation.

From the viewpoints of the resolving power and the heat sensitivity, it is preferred that the number average particle size of the compatible solid particles be 0.1 to 3 microns, especially 0.2 to 2 microns.

Water-soluble and water-dispersible binders customarily used for heat-sensitive recording materials of this type can be used as the binder in the present invention. As preferred examples, there can be mentioned polyvinyl alcohol, starch, carboxymethylated starch, hydroxyethylated starch, carboxymethyl cellulose, ethyl cellulose, gum arabic, gelatin, casein, polyvinyl pyrrolidone, polyacrylamide, styrene-maleic acid salt copolymers, vinyl ether-maleic acid salt copolymers and styrenebutadiene copolymer latices.

The phenolic color developer and leuco pigment, at least one of which is in the form of the above-mentioned compatible solid particles, are dispersed in an aqueous medium containing the above-mentioned water-soluble or water-dispersible binder to form a coating liquid.

In the present invention, it is preferred that the leuco pigment (A) and the phenolic color developer (B) be used at a weight ratio (A)/(B) of from 1/2.0 to 1/40, especially from 1/2.5 to 1/20. It also is preferred that the leuco pigment be made present in the recording layer in an amount of 2 to 30% by weight, especially 5 to 20% by weight, as dry solids based on the total composition. If the amount of the leuco pigment or phenolic color developer is too small and below the above range, the color density is reduced, and if the amount of the leuco pigment or phenolic color developer is increased beyond the above range, no particular improvement of the color density or other quality can be attained, but an economical disadvantage is brought about.

It is preferred that the binder be used in an amount of 20 to 80% by weight, especially 25 to 60% by weight, based on the sum of the amounts of the leuco pigment and phenolic color developer, at least one of which is in the form of the above-mentioned compatible solid particles.

For preparation of this coating liquid, there is preferably adopted a method in which one of the leuco pigment and phenolic color developer, at least one of which is in the form of the compatible solid particles, is added to a solution of the water-soluble or water-dispersible binder, the mixture is wet-pulverized to form a dispersion, and the other component is directly added to the dispersion or a dispersion of the other component is prepared in the same manner as described above and both the dispersions are mixed. From the viewpoint of the adaptability to the coating operation, it is preferred that the solid concentration of the coating liquid be 8 to 20% by weight.

In order to improve various characteristics of the heat-sensitive recording layer, known additives may be added to the coating liquid according to known recipes. For instance, in order to improve the whiteness of the recording layer or attain a bulking effect, a white pigment such as titanium dioxide or a filler such as a clay or calcium carbonate may be added. Furthermore, in order to adjust the recording sensitivity, there may be added an animal, vegetable or mineral wax such as paraffin wax or carnauba wax, stearic acid, an amide, soap or other derivative of a higher fatty acid or a synthetic waxy substance such as a polyethylene wax, a polypropylene wax or a polyethylene glycol. Moreover, in order to prevent coloration of the background, there may be added an alkanolamine such as triethanolamine or other organic base. Still further, there may be added a water resistance-imparting agent and a defoaming agent.

As the substrate on which the recording layer is to be formed, there can optionally be used papers, non-woven fabrics, artificial papers, various films, metal foils and laminates thereof. It is preferred that the basis amount of the recording layer be 2 to 10 g/m$^2$, especially 3 to 8 g/m$^2$, in the dry state.

The heat-sensitive recording element of the present invention can valuably be used as a recording element of a thermal head, a thermal pen, an infrared flash lamp or a laser device, which is used as the light source of a facsimile printer, a data communication device, a computer console unit, a measurement device, a passometer, a copying machine or the like.

The present invention will now be described in detail with reference to the following Examples that by no means limit the scope of the invention.

EXAMPLE 1

A mixture of 5 g of bisphenol A [2,2-bis(4'-hydroxyphenyl)propane] and 10, 25, 50, 100, 200, 300, 500, 1000, 2000, 3000 or 5000 mg of a fatty acid amide (a formaldehyde condensate of a mixture containing stearic acid amide and palmitic acid amide at a weight ratio of about 7/3) was dissolved in 10 to 15 g of diacetone alcohol under heating (120° C.), and the solution was gradually added to 300 ml of water and the mixture was stirred strongly. The formed white precipitate was washed with water, filtered and dried in an oven maintained at 60° C.

The melting point of the so-prepared solid solution of bisphenol A and fatty acid amide was measured by a commercially available melting point measuring device (Micro Melting Point Apparatus Model No. 428 supplied by Shibayama Seisakusho). The obtained results are shown in Table 1.

From the results shown in Table 1, it will readily be understood that the melting-initiating temperature of bisphenol A is lowered if it is formed into a solid solution with the fatty acid amide.

TABLE 1

| Compound | Content* (% by weight) of Fatty Acid Amide | Melting Temperature Range (°C.) (melting-initiating temperature to melting-completing temperature) |
|---|---|---|
| bisphenol A | — | 156 (single substance) |
| fatty acid amide | — | 143 (single substance) |

TABLE 1-continued

| Compound | Content* (% by weight) of Fatty Acid Amide | Melting Temperature Range (°C.) (melting-initiating temperature to melting-completing temperature) |
|---|---|---|
| solid solution (1) | 0.2 | 132-156 |
| solid solution (2) | 0.5 | 120-154 |
| solid solution (3) | 1.0 | 115-154 |
| solid solution (4) | 2.0 | 105-156 |
| solid solution (5) | 4.0 | 94-156 |
| solid solution (6) | 6.0 | 105-152 |
| solid solution (7) | 10 | 95-155 |
| solid solution (8) | 20 | 81-151 |
| solid solution (9) | 40 | 78-140 |
| solid solution (10) | 60 | 68-116 |
| solid solution (11) | 100 | 78-112 |

Note:
*the amount (% by weight based on bisphenol A) of the fatty acid amide solid disolved in bisphenol A

EXAMPLE 2

In the same manner as described in Example 1, 5 g of bisphenol A and 0.2 g (2% by weight) of a compound shown in Table 2 were commonly dissolved and precipitated to form solid solutions. The melting temperature ranges of the solid solutions were measured to obtain the results shown in Table 2.

TABLE 2

| Compound | Composition | Melting Temperature Range (°C.) |
|---|---|---|
| Compound of Example 1 | solid solution(a)*1 | 106-154 |
| Compound of Example 1 | solid solution(b)*2 | 111-156 |
| Compound of Example 1 | solid solution(c)*3 | 105-156 |
| ethylene-bis stearic acid amide | single substance | 141-145 |
| ethylene-bis stearic acid amide | solid solution(d) | 112-156 |
| 7/3 mixture of stearic acid amide and palmitic acid amide | single substance | 98-101 |
| 7/3 mixture of stearic acid amide and palmitic acid amide | solid solution(e) | 95-151 |
| zinc stearate | single substance | 122 |
| zinc stearate | solid solution(f) | 121-154 |
| mixture of stearic acid amide and vehenic acid amide | single substance | 104 |
| mixture of stearic acid amide and vehenic acid amide | solid solution(g) | 112-161 |
| 4,4'-dithiodimorpholine | single substance | 122 |
| 4,1'-dithiodimorpholine | solid solution(h) | 81-156 |
| zinc dibutyldithiocarbamate | single substance | 104 |
| zinc dibutyldithiocarbamate | solid solution(i) | 102-151 |
| oxidized low density polyethylene wax | single substance | 110 |
| oxidized low density polyethylene wax | solid solution(j) | 103-156 |

Note:
*1solid solution(4) of Example 1 having an amide content of 2%
*2tetrahydrofuran was used instead of diacetone alcohol, dissolution was effected at room temperature and precipitation was then conducted
*3after heating dissolution, water was poured into the solution to effect precipitation From the results shown in Table 2, it will readily be understood that the melting-initiating temperature is lowered by formation of the solid solution.

EXAMPLE 3

In a ball mill, 100 parts by weight (all "parts" given hereinafter are by weight) of the solid solution obtained in Example 1, 670 parts of an aqueous solution containing 5% by weight of polyvinyl alcohol and 100 parts of water were mixed and pulverized for 5 hours to form a liquid A (A-1 through A-11).

In a ball mill, 50 parts of Crystal Violet Lactone, 330 parts of an aqueous solution containing 5% by weight of polyvinyl alcohol and 50 parts of water were mixed and pulverized for 5 hours to form a liquid B.

For comparison, in the same manner as described above with respect to the liquid A, a liquid A' was prepared by using 100 parts of bisphenol A (comparative color former).

The so formed liquid A or A' was mixed with the liquid B so that the weight ratio of the phenolic color developer to Crystal Violet Lactone was 5, and the resulting coating liquid was coated on a slick paper having a basis weight of 55 g/m$^2$ by a wire bar and dried at 60° C. to form a heat-sensitive recording paper having a coating amount of about 5 g/m$^2$ on the dry basis. The heat-sensitive recording paper was passed at a speed of 4 cm/sec between rotary heater rollers (pressed under 1 Kg/cm; surface temperature=130° C.) to effect coloration under heating. The reflection density was measured by a commercially available densitometer (Macbeth RD-514) provided with a red filter. The obtained results are shown in Table 3.

TABLE 3

| Color Former | Reflection Density |
|---|---|
| comparative color developer (bisphenol A) | 0.80 |
| color developer of present invention | |
| solid solution (1) | 1.05 |
| solid solution (2) | 1.12 |
| solid solution (3) | 1.13 |
| solid solution (4) | 1.15 |
| solid solution (5) | 1.18 |
| solid solution (6) | 1.20 |
| solid solution (7) | 1.23 |
| solid solution (8) | 1.25 |
| solid solution (9) | 1.23 |
| solid solution (10 | 1.18 |
| solid solution (11) | 0.98 |

From the results shown in Table 3, it will readily be understood that a highest sensitizing effect is obtained in the solid solutions (7) and (8), namely when the amount of the acid amide to be solid-dissolved is 10 to 40%, while the sensitizing effect is reduced if the amount of the acid amide solid-dissolved is increased beyond this level. It was confirmed that if the amount of the acid amide solid-dissolved is 30% or larger, there is not a pressure-sensitive color-forming characteristic. That is, no color was formed even if the recording layer was scratched by a wire, a spike or a nail.

EXAMPLE 4

In the same manner as described in Example 3, a coating liquid was prepared by using the color developer (solid solution) of Example 2. The coating liquid was coated on a slick paper having a basis weight of 55 g/m$^2$ by a wire bar and dried at 60° C. to form a heat-sensitive recording paper having a coating amount of about 5 g/m$^2$ on the dry base. The heat-sensitive recording paper was passed at a speed of 4 cm/sec between heater rollers at various heating temperatures to effect color formation. The reflection density was measured. The obtained results are shown in FIG. 1.

In FIG. 1, curve Blank shows the results obtained when bisphenol A alone was used, and curves A through J show the results obtained when the solid solutions (a) through (j) shown in Table 2 were used, respectively. In case of each of the curves A through J, the formed color had a higher density than that of the formed color in case of the curve Blank, if the comparison was made at the same heating temperature.

When a fluoran type leuco pigment, a spiropyran type leuco pigment, a Rhodamine type leuco pigment, an Auramine type leuco pigment or a phenothiadine type leuco pigment was used instead of the triphenylmethane type leuco pigment such as Crystal Violet Lactone, similar results were obtained.

EXAMPLE 5

Color developer described below were prepared by using the fatty acid amide used in Example 1 and bisphenol A, and they were subjected to the comparative test.

Comparative color developer 1

Bisphenol A alone was used as the color developer.

Comparative color developer 2

A mere mixture of 100 parts of the fatty acid amide used in Example 1 and 50 parts of bisphenol A was used as the color developer.

Color developer 3 of present invention

A mixture of 100 parts of the fatty acid amide used in Example 1 and 50 parts of bisphenol A was heated and molten at 160° C. to dissolve them in each other sufficiently, and the melt was cooled and pulverized to form a solid solution which was used as the color developer.

In the same manner as described in Example 3, 100 parts of the color developer, 670 parts of an aqueous solution containing 5% by weight of polyvinyl alcohol and 100 parts of water were mixed and pulverized to form a color developer dispersion A-(1), A(2) and A-(3).

In the same manner as described above, a dispersion containing 50 parts of Crystal Violet Lactone (liquid B) was prepared.

A coating liquid was prepared by mixing 5 parts of the liquid B with 25.3 parts of the dispersion A-(1) or 76 parts of the dispersion A-(2) and A-(3) so that the amount of bisphenol A of the color developer component was 5 times the amount of Crystal Violet Lactone. The coating liquid was coated on a slick paper and dried at 60° C. to form a heat-sensitive recording paper (having a coating amount of about 6 g/m$^2$). The heat-sensitive and pressure-sensitive color-forming characteristics of the recording paper were examined. The obtained results are shown in Table 4.

TABLE 4

| Color Developer | Heat-Sensitive Color Formation (reflection density 120° C. | 130° C. | 140° C. | Pressure-Sensitive Color Formation (scratched by nail) |
|---|---|---|---|---|
| 1 (comparison | 0.35 | 0.83 | 1.05 | blue color formation |
| 2 (comparsion | 0.20 | 0.31 | 0.67 | no color formation |
| 3 (presemt | 0.42 | 0.92 | 1.10 | no color formation |

TABLE 4-continued

| Color Developer | Heat-Sensitive Color Formation (reflection density 120° C. | 130° C. | 140° C. | Pressure-Sensitive Color Formation (scratched by nail) |
|---|---|---|---|---|
| invention | | | | |

From the results shown in Table 4, it is seen that when the fatty acid amide is merely mixed with bisphenol A, the susceptibility to coloration under pressure is effectively reduced but the heat sensitivity is rather degraded. It also is seen that in the heat-sensitive recording paper prepared according to the present invention, the heat sensitivity is excellent and the effect of preventing color formation under pressure is very good.

EXAMPLE 6

In order to examine the effects attained by using the color developer in the form of a solid solution, the following comparative experiment was carried out.

Preparation of Color Developer Dispersion (Liquid C)

C-1:

Bisphenol A alone

C-2:

A mixture (100/2) of bisphenol A and a fatty acid amide (formaldehyde condensate of a mixture containing stearic acid amide and palmitic acid amide at a weight ratio of about 7/3)

C-3:

A solid solution of C-2 (prepared in the same manner as described in Example 1)

C-4:

A mixture (100/2) of bisphenol A and ethylene-bis-stearic acid amide

C-5:

A solid solution of C-4 (prepared in the same manner as described in Example 1)

C-6:

A mixture (100/2) of bisphenol A and a fatty acid amide (a mixture containing stearic acid amide and palmitic acid amide at a weight ratio of about 7/3)

C-7:

A solid solution of C-6 (prepared in the same manner as described in Example 1)

C-8:

A mixture (100/2) of bisphenol A and zinc stearate

C-9:

A solid solution of C-8 (prepared in the same manner as described in Example 1)

In a ball mill, 100 parts of the color developer C, 170 parts of an aqueous solution containing 20% by weight of etherified starch and 340 parts of water were mixed and pulverized for 5 hours to form a liquid C' (C'-1 through C'-9).

Preparation of Leuco Pigment Dispersion (Liquid D)

In a ball mill, 50 parts of Crystal Violet Lactone, 85 parts of an aqueous solution containing 20% by weight of etherified starch and 170 parts of water were mixed and pulverized for 5 hours to obtain a liquid D.

Preparation of Coating Liquid (Liquid E)

Coating liquids E-1 through E-9 were prepared by mixing 5 parts of the liquid D with 25 parts of the liquid C'-1 or 25.5 parts of the liquid C'-2, C'-3, C'-4, C'-5, C'-6, C'-7, C'-8 or C'-9 so that the amount of bisphenol A of the color developer component was 5 times the amount of Crystal Violet Lactone.

The coating liquid was coated on a slick paper and dried to form a heat-sensitive recording paper having a coating amount of about 5 g/m$^2$ on the dry base. In the same manner as described in Example 4, color formation was effected at various temperatures, and the reflection density was measured. The obtained results are shown in Table 5.

TABLE 5

| Color Developer | Reflection Density Heating Temperature (°C.) 100 | 110 | 120 | 130 | 140 |
|---|---|---|---|---|---|
| C-1 (blank) | 0.25 | 0.32 | 10.48 | 0.80 | 1.17 |
| C-2 (comparison) | 0.25 | 0.34 | 0.55 | 0.84 | 1.06 |
| C-3 (present invention) | 0.30 | 0.64 | 1.10 | 1.34 | 1.42 |
| C-4 (comparison) | 0.24 | 0.32 | 0.51 | 0.94 | 1.21 |
| C-5 (present invention) | 0.28 | 0.57 | 0.92 | 129 | 1.39 |
| C-6 (comparison) | 0.44 | 0.58 | 0.76 | 1.01 | 1.09 |
| C-7 (present invention) | 0.67 | 1.01 | 1.11 | 1.26 | 1.30 |
| C-8 (comparison) | 0.25 | 0.32 | 0.46 | 0.88 | 1.05 |
| C-9 (present invention) | 0.25 | 0.32 | 0.55 | 0.92 | 1.15 |

From the results shown in Table 5, it will readily be understood that when a phenolic color developer is made present in the form of a solid solution with an organic solid medium having a compatibility with the phenolic color developer, the density of the formed color is increased over the density obtained when the phenolic color developer is made present in the form of a mere mixture with the organic solid medium (both the components are independently dispersed).

As another method for formation of the solid solution, there could be adopted a method in which bisphenol A and the organic solid medium compatible therewith were dissolved in hot chlorobenzene (120° C.) at a high concentration (for example, 150%), the solution was cooled to 5° C. and filtered, and the collected precipitate was dried at 60° C. to form a solid solution. From the results of the experiment conducted separately, it was confirmed that a color developer having a high sensitivity could be similarly obtained according to this method.

EXAMPLE 7

In the same manner as described in Example 3, a solid solution was prepared except that bisphenol S [bis(4'-hydroxyphenyl)sulfone, melting point=246.0° to 248° C.] was used instead of bisphenol A and a mixture containing stearic acid amide and palmitic acid amide at a ratio of 7/3 was used as the fatty acid amide, and the color formation test was carried out in the same manner as described in Example 3. The obtained results are shown in Table 6.

TABLE 6

| Heating Temperature (°C.) | Reflection Density Composition (bisphenol S/fatty acid amide) of Solid Solution 100/0 | 100/10 | 100/20 | 100/40 | 100/60 |
|---|---|---|---|---|---|
| 140 | 0.25 | 0.65 | 1.02 | 0.79 | 0.75 |
| 150 | 0.26 | 0.96 | 1.08 | 1.10 | 1.08 |
| 160 | 0.27 | 1.02 | 1.13 | 1.26 | 1.11 |

From the results shown in Table 6, it will readily be understood that when the phenolic color developer is used in the form of a solid solution with a compatible organic solid medium, the heat sensitivity can be increased and a highest effect can be obtained when the content of the organic solid medium in the solid solution is about 40% based on the phenolic color developer.

EXAMPLE 8

In order to examine the effects attained by using a leuco pigment in the form of a solid solution, the following comparative experiment was carried out.

Preparation of Leuco Pigment Dispersions (Liquid A')

A-1:

Crystal Violet Lactone alone

The following mixtures (comparisons) of Crystal Violet Lactone (A-1) and a fatty acid amide (a mixture containing stearic acid amide and palmitic acid amide at a ratio of about 7/3) differing in the weight ratio [(A-1)/fatty acid amide weight ratio] were used (both the components were present in the form of independent particles).

A-2:

(A-1)/fatty acid amide ratio = 10/1

A-3:

(A-1)/fatty acid amide ratio = 10/2.5

A-4:

(A-1)/fatty acid amide ratio = 10/5

A-5:

(A-1)/fatty acid amide ratio = 10/10

A-6:

(A-1)/fatty acid amide ratio = 10/25

The following solid solutions of Crystal Violet Lactone (A-1) and the fatty acid amide according to the present invention (present in the form of compatible solid particles of both the components) were used.

Each solid solution was prepared by dissolving 10 parts by weight (all of "parts" given hereinafter are by weight) of Crystal Violet Lactone and a predetermined amount of the above-mentioned fatty acid amide in 35 to 60 parts of diacetone alcohol under heating at 120° C., mixing the solution with 500 parts of water and filtering, water-washing and drying (60° C.) the formed precipitate.

A-7:

Solid solution of A-2

A-8

Solid solution of A-3

A-9:

Solid solution of A-4

A-10:

Solid solution of A-5

A-11:

Solid solution of A-6

In a ball mill, 10 parts of the leuco pigment A-1, the mixture A-2, A-3, A-4, A-5 or A-6 or the solid solution A-7, A-8, A-9, A-10 or A-11, 67 parts of an aqueous solution containing 5% by weight of polyvinyl alcohol and 10 parts of water were mixed and pulverized for 5 hours to obtain a liquid A' (A'-1 through A'-11).

Preparation of Color Developer Dispersion (Liquid B)

In a ball mill, 100 parts of 2,4-dihydroxybenzophenone, 670 parts of an aqueous solution containing 5% by weight of polyvinyl alcohol and 100 parts of water were mixed and pulverized for 5 hours to form a liquid B.

Preparation of Heat-Sensitive Recording Paper and Color Formation Test

The liquid A' was mixed with the liquid B so that the amount of the phenolic color developer was 5 times the amount of Crystal Violet Lactone on the weight base to form a coating liquid. The coating liquid was coated on a slick paper having a basis weight of 55 g/m$^2$ by a wire bar and dried at 60° C. to obtain a heat-sensitive recording paper having a coating amount of about 5 g/m$^2$. The recording paper was passed at a speed of 4 cm/sec between rotary heater rollers (pressed under 1 Kg/cm) at a heating temperature (roller surface temperature) shown in Table 7 to effect coloration under heating. The reflection density of the formed color was measured by a commercially available densitometer (Macbeth RD-514 with a red filter). The obtained results are shown in Table 7.

From the results shown in Table 7, it will readily be understood that in case of a mixed dispersion of the leuco pigment and the fatty acid amide, the density of the formed color is lower than the density of the color formed in case of the leuco pigment alone, whereas in case of a solid solution dispersion of the leuco pigment and the fatty acid amide, the density of the formed color is much higher than the density of the color formed when the leuco pigment alone is used. It will also be seen that when the amount of the fatty acid amide exceeds 100% by weight based on the leuco pigment in the solid solution, the density of the formed color is reduced at a higher temperature and that it is preferred that the amount of the fatty acid amide be 5 to 100% by weight based on the leuco pigment.

TABLE 7

| Form of Leuco Pigment | Reflection Density Heating Temperature (°C.) | | | | | |
|---|---|---|---|---|---|---|
| | 90 | 100 | 110 | 120 | 130 | 140 |
| A-1 alone | 0.07 | 0.20 | 0.38 | 0.70 | 0.82 | 1.10 |
| dispersed mixture particles | | | | | | |
| A-2 | 0.07 | 0.13 | 0.22 | 0.48 | 0.68 | 0.96 |
| A-3 | 0.09 | 0.15 | 0.27 | 0.58 | 0.86 | 1.00 |
| A-4 | 0.08 | 0.14 | 0.26 | 0.45 | 0.62 | 0.76 |
| A-5 | 0.07 | 0.13 | 0.22 | 0.42 | 0.60 | 0.77 |
| A-6 | 0.07 | 0.11 | 0.18 | 0.38 | 0.56 | 0.73 |
| compatible solid particles (solid solution) | | | | | | |
| A-7 | 0.30 | 0.54 | 0.78 | 0.89 | 1.05 | 1.10 |
| A-8 | 0.36 | 0.68 | 0.90 | 0.99 | 1.07 | 1.13 |
| A-9 | 0.28 | 0.46 | 0.66 | 0.88 | 0.94 | 1.00 |
| A-10 | 0.22 | 0.56 | 0.77 | 0.87 | 0.93 | 0.90 |
| A-11 | 0.22 | 0.56 | 0.81 | 0.84 | 0.80 | 0.76 |

EXAMPLE 9

In the same manner as described in Example 8, heat-sensitive recording papers were prepared from combinations shown in Table 8.

The obtained heat-sensitive recording papers were passed through heater rollers in the same manner as described in Example 8 and the reflection densities of the formed colors were measured. The obtained results are shown in Table 9.

TABLE 8

| Combination | Leuco Pigment | Compatible Organic Solid Medium | Form and Weight Ratio of Particles | Phenolic Color Developer | Binder |
|---|---|---|---|---|---|
| (1)-a | fluoran type leuco pigment(green) color forming, m.p. = 163°) | — | dispersed single substance particles | p-vinylphenol polymer (m.p. = 190° C.) | polyvinyl alcohol |
| (1)-b | fluoran type leuco pigment (green color forming, m.p. = 163°) | fatty acid amide*1 (m.p. = 108°C.) | dispersed mixture particles (10/2.5) | p-vinylphenol polymer (m.p. = 190° C.) | polyvinyl alcohol |
| (1)-c | fluoran type leuco pigment (green color forming, mp. = 163°) | fatty acid amide*1 (m.p. = 108° C.) | dispersed solid solution particles (10/2.5) | p-vinylphenol polymer (m.p. = 190° C.) | polyvinyl alcohol |
| (2)-a | fluoran type leuco pigment (green color forming, m.p. = 163°) | — | dispersed single substance particles | 4,4'-thio-bis (6-tert-butyl 3-methylphenol) (m.p. = 160° C.) | etherified starch*2 |
| (2)-b | fluoran type leuco pigment (green color forming, m.p. = 163°) | fatty acid amide*1 (m.p. = 108° C.) | dispersed mixture particles (10/2.5) | 4,4'-thio-bis (6-tert-butyl-3-methylphenol (m.p. = 160° C.) | etherfied starch*2 |
| (2)-c | fluoran type leuco pigment (green color forming, m.p. = 163°) | fatty acid amide*1 (m.p. = 108° C.) | dispersed solid solution particles (10/2.5) | 4,4'-thio-bis (6-tert-butyl-3-methylphenol) (m.p. = 160° C.) | etherified starch*2 |
| (3)-a | Crystal Violet Lactone (m.p. = 180° C.) | — | dispersed single substance particles | 2,2-bis(4'-hydroxyphenyl) propane (m.p. = 156° C.) | etherified starch*2 |
| (3)-b | Crystal Violet Lactone (m.p. = 180° C.) | oxidized polyethylene (m.p. = 98° C.) | dispersed mixture particles (10/1) | 2,2-bis(4'-hydroxyphenyl) propane (m.p. = 156° C.) | etherified starch*2 |
| (3)-c | Crystal Violet Lactone (m.p. = 180° C.) | oxidized polyethylene (m.p. = 98° C.) | dispersed solid solution particles (10/1) | 2,2-bis(4'-hydroxyphenyl) propane (m.p. = 156° C.) | etherified starch*2 |
| (4)-a | Crystal Violet Lactone (m.p. = 180° C.) | — | dispersed single substance particles | 2,2-bis(4'-hydroxyphenyl) propane (m.p. = 156° C.) | etherified starch*2 |
| (4)-b | Crystal Violet Lactone (m.p. = 180° C.) | 4-vinylpyridine polymer (s.p = 110° C.) | dispersed moisture particles (10/2.5 ) | 2,2-bis(4'-hydroxphenyl) propane (m.p. = 156° C.) | etherfied starch*2 |
| (4)-c | Crystal Violet Lactone (m.p. = 180° C.) | 4-vinylpyridine polymer (s.p = 110° C.) | dispersed solid solution particles (10/2.5) | 2,2-bis(4'-hydroxphenyl) propane (m.p. = 156° C.) | etherfied starch*2 |

Note:
*1formaldehyde condensate of a mixture containing stearic acid amide and palmitic acid amide at a ratio of about 7/3
*2used in the form as aqueous solution having a concentration of 20% by weight

TABLE 9

| Combination | Heating Temperature (°C.) | Reflection Density* |
|---|---|---|
| (1)-a | 160 | 0.32 |
| (1)-b | 160 | 0.73 |
| (1)-c | 160 | 1.19 |
| (2)-a | 150 | 0.70 |
| (2)-b | 150 | 1.00 |
| (2)-c | 150 | 1.28 |
| (3)-a | 110 | 0.40 |
| (3)-b | 110 | 0.39 |
| (3)-c | 110 | 0.76 |
| (3)-a | 130 | 0.85 |
| (3)-b | 130 | 1.00 |
| (3)-c | 130 | 1.31 |
| (4)-a | 130 | 0.85 |
| (4)-b | 130 | 0.88 |
| (4)-c | 130 | 1.23 |

Note:
*neutral filter was used for the measurement of the green color

From the results shown in Table 9, it will readily be understood that in each combination, a color having a higher density is obtained in a recording paper prepared by using the leuco pigment and organic solid medium in the form of compatible solid particles.

A similar tendency was observed when a Rhodamine lactam type leuco pigment, a spiropyran type leuco pigment, an Auramine type leuco pigment or a phenothiazine type leuco pigment was used instead of the above-mentioned leuco pigment.

EXAMPLE 10

A solid solution was prepared from an organic solid medium shown in Table 10 and Crystal violet Lactone, and in the same manner as described in Example 8, a heat-sensitive recording paper was prepared by using the so prepared solid solution, 2,2-bis(4'-hydroxyphenyl)propane as a color developer and a 5% by weight aqueous solution of polyvinyl alcohol as a binder. The recording paper was passed through heater rollers to examine the color-forming property. The obtained results are shown in Table 10.

TABLE 10

| Organic Solid Medium | Pigment/ Medium Weight Ratio | Heating Temperature (°C.) | Reflection Density |
|---|---|---|---|
| — | 10/0 | 140 | 1.05 |
| low density polyethylene(m.p. = 110° C.) | 10/2 | 140 | 1.28 |
| zinc dibutyldithiocarbamate(m.p. = 103° C.) | 10/1 | 140 | 1.22 |
| styrene homopolymer (s.p = 125° C.) | 10/2 | 140 | 1.27 |
| microcrystalline wax (m.p. = 110° C.) | 10/1 | 140 | 1.29 |
| zinc stearate (m.p. = 122° C.) | 10/1 | 140 | 1.28 |

In each case, the density of the formed color was higher than the density of the color formed when the leuco pigment was not formed into a solid solution.

The solid solutions described hereinbefore were prepared according to the method described in Example 8, that is, the first method described in the text of the instant specification. When low density polyethylene or zinc stearate is used, the second method may be adopted, and when microcrystalline wax is used, the third method may be adopted.

EXAMPLE 11

In 250 parts of diacetone alcohol were dissolved 100 parts of 2,2'-bis(4'-hydroxyphenyl)propane and 10 parts of erucic acid amide (having a melting point of 79° C.) under heating, and the formed solution was poured into 3600 parts of water to precipitate a solid solution of the color developer. The precipitate was recovered by filtration, washed with water and dried at 60° C. For comparison, a color developer composed of a mixture containing 2,2'-bis(4'-hydroxyphenyl)propane and erucic acid amide at a weight ratio of 10/1 was separately prepared. The so-formed solid solution was combined with the leuco pigment solid solution (3)-c of Example 9, and a heat-sensitive recording paper was prepared in the same manner as described in Example 8. The recording paper was passed through heater rollers (surface temperature = 100° C.). The density of the formed color was 1.05. When the comparative color developer was used, the density of the formed color was only 0.80.

What I claim is:

1. A heat-sensitive color-forming recording material which comprises a recording layer comprising a particulate phenolic color developer and a particulate leuco pigment, which are dispersed in a binder independently from each other, wherein the phenolic color developer and/or leuco pigment is present in the form of compatible solid particles with a substantially inactive organic solid medium selected from the group consisting of sterically hindered phenol compounds, said organic solid medium having a melting or softening point lower than that of the phenolic color developer and/or leuco pigment and said organic solid medium is present in said compatible solid particles in an amount [2 to 250 times as large as] *of 0.2 to 250% by weight, based on* the amount of the phenolic color developer and/or leuco pigment on the weight base.

2. A recording material as set forth in claim 1, wherein the organic solid medium is present in an amount of 5 to 100% by weight based on the phenolic color former and/or leuco pigment.

3. A recording material as set forth in claim 1, wherein the number average particle size of the compatible solid particles is 0.1 to 3 microns.

4. A recording material as set forth in claim 1, wherein the binder is a water-soluble or water-dispersible binder.

5. A recording material as set forth in claim 1, wherein the recording layer contains the leuco pigment and the phenolic color former at a weight ratio of from ½ to 1/40 and the amount of the leuco pigment is 2 to 30% by weight based on the total recording layer.

6. A recording material as set forth in claim 1 wherein the organic solid medium is a sterically hindered phenol selected from the group consisting of 2,6-di-tert-butyl-p-cresol, 2,2-methylene-bis(4-ethyl-6-tertbutylphenol), 2-hydroxy-4-methoxybenzophenone, phenyl salicylate, p-tert-butyl salicylate and 2-(2'-hydroxy-5'-methylphenyl)-benzotriazole.

* * * * *